United States Patent Office 2,759,820

Patented Aug. 21, 1956

2,759,820

LIGHT-SENSITIVE MATERIAL FOR PHOTO-MECHANICAL PRINTING

Wilhelm Neugebauer and Martha Tomanek, Wiesbaden-Biebrich, Germany, assignors, by mesne assignments, to Azoplate Corporation, Summit, N. J., a corporation of New Jersey

No Drawing. Application January 16, 1951, Serial No. 206,302

Claims priority, application Germany January 23, 1950

13 Claims. (Cl. 95—8)

The present invention relates to light-sensitive material suitable for the production of lithographic printing plates. More particularly, the invention relates to base material which has been photo-sensitized by coating it with a layer containing cinnamal-malonic acid or derivatives thereof and to the production of printing plates from this photosensitized base material.

Many methods of photo-mechanical reproduction and many types of light-sensitive material therefor are known in the art. However, none of these known methods or materials make use of cinnamal-malonic acid of the formula:

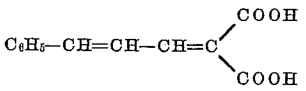

The advantages of this compound for lithography will be apparent from the following description.

Cinnamal-malonic acid, the formula for which is given above, is a yellow colored substance the preparation of which has been repeatedly described in the literature (for example by Liebermann, "Berichte der deutschen chemischen Gesellschaft," volume 28 (1895), page 1439). The salts, substitution products and functional derivatives of cinnamal-malonic acid may also be used according to the present invention. In some cases these modified compounds may produce an even better result. These chemical compounds are colorless or of a pale yellow color and most of them are described in the literature. They can be obtained without particular difficulty by causing the corresponding cinnamic aldehydes to react with malonic acid or its functional derivatives according to known methods.

According to this invention, these chemical compounds are dissolved in water or an organic solvent, such as alcohol, or a mixture consisting of water and organic solvent. This solution is applied to a suitable base preferably a metal foil or metal plate. It is not necessary to add a hardenable colloid which may be tanned by the action of light. The light-sensitive metal foil or metallic plate is exposed to an actinic light image in known manner; e. g. through a master pattern. A carbon arc lamp or any other light source emitting ultraviolet light may be used. The exposed material is rubbed with greasy ink and then washed with a dilute alkaline solution of, for example, soda ash or trisodium phosphate and if necessary with a dilute acid solution, for example, phosphoric acid, or with a buffer solution. This washing treatment removes the cinnamal-malonic acid which has been exposed to light so that the fatty ink is removed from the areas which were exposed to actinic light, but the ink adheres to the unexposed areas of the plate.

It is possible to add to the solutions of cinnamal-malonic acid and its derivatives other substances of types usually used in the reproduction technics for physical or chemical improvement of the light-sensitive layer; such substances may be sensitized agents, dyestuffs which bleach out to indicate the course of the exposure, substances which become colored during the exposure to light, salts, buffers, and so on. In most cases, best results are obtained by using a coating solution in the pH-range of 6–8.

An aluminum plate with a surface layer of aluminum oxide produced chemically or electrolytically is a suitable base material for the light-sensitive substance. Other methods of slightly roughening the surface may also be used.

The exact nature of the change in the cinnamal-malonic acid caused by the exposure to ultra-violet light is not fully understood. It is known that ultra-violet light dimerizes this chemical compound but it is not seen how this can account for the results obtained according to the present invention.

The following examples are inserted to illustrate the present invention without any intention of limiting the scope of the invention to the subject matter thereof.

(1) A solution of 2.5 parts of mono-sodium and 2.5 parts of di-sodium salt of cinnamal-malonic acid in 100 parts of a 50% aqueous alcohol solution is applied to an anodically oxidized aluminum foil, by means of a plate-whirler, for example, and thereafter dried. The foil is exposed under a positive master (a master with a clear background requires about 2 minutes exposure to a carbon arc lamp drawing a current of 18 amperes at a distance of 60 cm. from the foil), rubbed with fatty ink and developed with a 3% solution of phosphoric acid or an aqueous solution containing 2 parts of alum and 1 part of nitric acid in 100 cc. of water. A positive image is obtained from which copies can be made on an offset printing machine.

The aluminum foil coated with the above mentioned mixture of sodium salts of cinnamal-malonic acid can be stored in the light-sensitive state without losing its usefulness in the reproduction process.

(2) The procedure of Example 1 is followed but only the mono-sodium salt of cinnamal-malonic acid is used. Positive images suitable for positive printing foils are obtained.

(3) Concentrated ammonia is added to a 5% solution of cinnamal-malonic acid in a 1:1 solution of dioxane in water until the solution has a weakly alkaline reaction to phenolphthalein. This solution is used for coating a superficially oxidized aluminum foil. Thereafter the procedure follows that described in Example 1. Positive printing plates are obtained from positive masters.

(4) A solution of 50% alcohol in water containing 5% of cinnamal-malonic acid dimethyl ester is coated on a base material and dried. The coated material is processed as described in Example 1. Positive printing plates are obtained.

(5) 2 parts of sodium chloride are dissolved in 10 cc. of water and added to a solution consisting of 1 part of cinnamal-malonic acid dissolved in 80 parts of alcohol. A superficially oxidized aluminum foil is coated with this solution. After exposure to light under a positive master a yellow positive image is obtained which is rubbed with fatty ink and treated with phosphoric acid as described in Example 1.

(6) A coating solution is used consisting of 1 part of 4-azido-cinnamal-malonic acid dissolved together with 1 part of soda, in 100 cc. of water. This solution is coated on a superficially oxidized aluminum plate and dried. After exposure under a positive master it is rubbed with greasy ink and developed by washing with a solution consisting of 22.5 parts of di-sodium phosphate and 27.5 parts of ammonium chloride in 1000 cc. of water. If a positive master is used, positive printing plates are obtained.

4-azido-cinnamal-malonic acid is obtained from 4-diazo-cinnamal-malonic acid and ammonia. The diazonium salt is obtained by diazotization of 4-amino-cinnamal-malonic acid with sodium nitrate (compare Flecht, "Berichte der deutschen chemischen Gesellschaft," volume 40 (1907), page 3901). 4-azido-cinnamal-malonic acid is a yellow colored crystalline substance which is very light-sensitive.

(7) A coating solution consisting of 1 part of 4-azido-cinnamal-malonic acid, 1 part of soda ash and 100 cc. of a 50% aqueous alcohol solution is used as described in the examples given above. After drying, the foil is exposed to light under a positive pattern, rubbed with fatty ink and developed by washing with a 10% soda ash solution or a 10% solution of tri-sodium phosphate. Positive printing plates are obtained.

(8) A coating solution is prepared by dissolving 1 part of the di-sodium salt of 4-nitro-cinnamal-malonic acid in 100 cc. of a 50% aqueous alcohol solution. The procedure is the same as described in Example 1, but in this case an exposure about three times as long as usual is required. The preparation of 4-nitro-cinnamal-malonic acid is described by Einhorn and Gehrenbeck in "Annalen der Chemie," volume 253 (1889), page 361.

(9) A 4% solution of the dinitrile of cinnamal-malonic acid dissolved in a mixture of equal parts of dioxane and alcohol is coated on a superficially oxidized aluminum plate, dried and exposed to light under a positive master. The exposed layer is rubbed with 5% phosphoric acid for about two minutes and thereafter with fatty ink and again with phosphoric acid. A positive printing plate is obtained.

(10) A 4% solution of the diamide of cinnamal-malonic acid in a solution of equal parts of dioxane and alcohol is used as the coating solution. After drying and exposing to actinic light under a positive pattern the coated material is treated as described in Example 1. Positive printing forms are obtained.

After having fully disclosed and described our present invention, we claim:

1. Light-sensitive material suitable for the production of lithographic printing plates comprising a thin aluminum sheet having a slightly roughened surface and a coating consisting of a light-sensitive substance selected from the group consisting of cinnamal-malonic acid, the alkali salts, nitriles, amides and aliphatic esters thereof, cinnamal malonic acid in which azido groups are substituted and cinnamal malonic acid in which nitro groups are substituted coated in a thin uniform layer thereon.

2. Light-sensitive material suitable for the production of lithographic printing plates comprising a thin aluminum sheet having a slightly roughened surface and a coating consisting of a sodium salt of cinnamal-malonic acid coated in a thin uniform layer thereon.

3. Light-sensitive material suitable for the production of lithographic printing plates comprising a thin aluminum sheet having a slightly roughened surface and a coating consisting of 4-nitro-cinnamal-malonic acid coated in a thin uniform layer thereon.

4. Light-sensitive material suitable for the production of lithographic printing plates comprising a thin aluminum sheet having a slightly roughened surface and a coating consisting of cinnamal-malonic acid dinitrile coated in a thin uniform layer thereon.

5. Light-sensitive material suitable for the production of lithographic printing plates comprising a thin aluminum sheet having a slightly roughened surface and a coating consisting of cinnamal-malonic acid dimethylester coated in a thin uniform layer thereon.

6. Light-sensitive material suitable for the production of lithographic printing plates comprising a thin aluminum sheet having a slightly roughened surface and a coating consisting of cinnamal-malonic acid diamide coated in a thin uniform layer thereon.

7. The process of producing lithographic printing plates comprising the steps of coating a surface of an aluminum base material with a solution the solute of which consists of a light-sensitive substance selected from the group consisting of cinnamal-malonic acid, the alkali salts, nitriles, amides and aliphatic esters thereof, cinnamal-malonic acid in which azido groups are substituted and cinnamal-malonic acid in which nitro groups are substituted, drying the coated base material, exposing the coated surface to actinic light under a master, rubbing the exposed surface with greasy ink and washing said surface with an aqueous medium selected from the group consisting of dilute alkaline and dilute acid solutions to remove the light-sensitive substance which was struck by light together with the over-lying greasy ink in the light struck areas.

8. The process of producing lithographic printing plates comprising the steps of coating a surface of a superficially oxidized aluminum sheet with a solution the solute of which consists of a light-sensitive substance selected from the group consisting of cinnamal-malonic acid, the alkali salts, nitriles, amides and aliphatic esters thereof, cinnamal-malonic acid in which azido groups are substituted and cinnamal-malonic acid in which nitro groups are substituted, drying the coated base material, exposing the coated surface to actinic light under a master, rubbing the exposed surface with greasy ink and washing said surface with an aqueous medium selected from the group consisting of dilute alkaline and dilute acid solutions to remove the light-sensitive substance which was struck by light together with the over-lying greasy ink in the light struck areas.

9. The process of producing lithographic printing plates comprising the steps of coating a slightly roughened surface of a thin aluminum sheet with a solution the solute of which consists of the light-sensitive substance cinnamal-malonic acid dimethylester, drying the coated aluminum base, exposing the coated surface to actinic light under a master, rubbing the exposed surface with greasy ink and washing said surface with an aqueous medium selected from the group consisting of dilute alkaline and dilute acid solutions to remove the light-sensitive substance which was struck by light together with the over-lying greasy ink in the light struck areas.

10. The process of producing lithographic printing plates comprising the steps of coating a slightly roughened surface of a thin aluminum sheet with a solution the solute of which consists of the light-sensitive substance cinnamal-malonic acid diamide, drying the coated aluminum base, exposing the coated surface to actinic light under a master, rubbing the exposed surface with greasy ink and washing said surface with an aqueous medium selected from the group consisting of dilute alkaline and dilute acid solutions to remove the light-sensitive substance which was struck by light together with the over-lying greasy ink in the light struck areas.

11. The process of producing lithographic printing plates comprising the steps of coating a slightly roughened surface of a thin aluminum sheet with a solution, the solute of which is light-sensitive and consists of a sodium salt of cinnamal-malonic acid, drying the coated aluminum base, exposing the coated surface to actinic light under a master, rubbing the exposed surface with greasy ink and washing said surface with an aqueous medium selected from the group consisting of dilute alkaline and dilute acid solutions to remove the light-sensitive substance which was struck by light together with the over-lying greasy ink in the light struck areas.

12. The process of producing lithographic printing plates comprising the steps of coating a slightly roughened surface of a thin aluminum sheet with a solution, the solute of which consists of the light-sensitive substance 4-nitro-cinnamal-malonic acid, drying the coated aluminum base, exposing the coated surface to actinic light under a master, rubbing the exposed surface with greasy ink and washing said surface with an aqueous medium selected from the group consisting of dilute alkaline and dilute acid solutions to remove the light-sensitive substance which was struck by light together with the over-lying greasy ink in the light struck areas.

13. The process of producing lithographic printing plates comprising the steps of coating a slightly roughened surface of a thin aluminum sheet with a solution, the solute of which consists of the light-sensitive substance cinnamal-malonic acid dinitrile, drying the coated aluminum base, exposing the coated surface to actinic light under a master, rubbing the exposed surface with an aqueous medium selected from the group consisting of dilute alkaline and dilute acid solutions to remove the light-sensitive substance which was struck by light together with the over-lying greasy ink in the light struck areas.

References Cited in the file of this patent

UNITED STATES PATENTS

| | | |
|---|---|---|
| 1,587,274 | Beebe et al. | June 1, 1926 |
| 1,965,710 | Murray | July 10, 1934 |
| 2,309,027 | Toland et al. | Jan. 19, 1943 |
| 2,312,854 | Toland et al. | Mar. 2, 1943 |
| 2,313,848 | Toland et al. | Mar. 16, 1943 |
| 2,344,487 | Bassist | Mar. 21, 1944 |
| 2,361,665 | Toland et al. | Oct. 31, 1944 |
| 2,405,513 | Mullen | Aug. 6, 1946 |
| 2,532,866 | Toland et al. | Dec. 5, 1950 |
| 2,610,120 | Minsk et al. | Sept. 9, 1952 |

FOREIGN PATENTS

| | | |
|---|---|---|
| 433,538 | Great Britain | Aug. 12, 1935 |
| 449,772 | Great Britain | July 2, 1936 |
| 880,027 | France | Dec. 10, 1942 |
| 904,255 | France | Feb. 19, 1945 |

OTHER REFERENCES

Clerc Ilford Manual of Process Work (4th ed. 1946) Ilford Limited London, pp. 236 and 237. (Copy in S. L.)

Kohler: American Chemical Journal, vol. 28 (1902), pp. 233–240. (Copy in Patent Office Scientific Library.)

Liebermann, Berichte der Deutschen Chemischen Gesellschaft, vol. 28 (1895), pp. 1438–1448. (Copy in S. L.)

Beilstein, Vierte Auflage, pp. 912 and 1005, vol. 9 (1926). (Copy in Patent Office Scientific Library.)